United States Patent [19]

Conklin

[11] Patent Number: 4,620,280
[45] Date of Patent: Oct. 28, 1986

[54] INTELLIGENT DRIVERLESS VEHICLE

[75] Inventor: Barry C. Conklin, Easton, Pa.

[73] Assignee: SI Handling Systems, Inc., Easton, Pa.

[21] Appl. No.: 518,570

[22] Filed: Jul. 29, 1983

[51] Int. Cl.$^4$ .................. B61L 27/00; G06F 15/50
[52] U.S. Cl. .................................... 364/426; 364/424; 104/301; 104/295; 104/166; 180/168
[58] Field of Search ............... 364/424, 426, 449, 460, 364/461; 104/300, 301, 295, 166, 165; 318/587; 180/168, 169, 167

[56] References Cited

U.S. PATENT DOCUMENTS

| | | | |
|---|---|---|---|
| 3,474,877 | 10/1969 | Wesener | 180/168 |
| 3,646,613 | 2/1972 | Matsumoto et al. | 104/295 |
| 3,650,216 | 3/1972 | Harwick et al. | 104/166 |
| 3,669,206 | 6/1972 | Tax et al. | 318/587 |
| 3,817,344 | 6/1974 | Asano et al. | 180/168 |
| 3,818,837 | 6/1974 | Jacoby et al. | 104/166 |
| 3,903,810 | 9/1975 | Jones | 104/166 |
| 4,237,994 | 12/1980 | McColl | 364/424 |
| 4,266,273 | 5/1981 | Dobler et al. | 364/424 |
| 4,335,381 | 6/1982 | Palmer | 104/301 |

Primary Examiner—Parshotam S. Lall
Attorney, Agent, or Firm—Seidel, Gonda, Goldhammer & Abbott

[57] ABSTRACT

An intelligent driverless vehicle rolls on a track and has a pair of drive wheels which engage with a rotating drive shaft. The angular position of the drive wheels relative to the drive shaft determines the speed of the vehicle. Each vehicle has a microcomputer associated therewith, a position encoder for supplying information regarding the position of the vehicle to the microcomputer, an angular position encoder for providing information regarding the angular position of the drive wheels to the microcomputer for the computation of vehicle speed, and a drive wheel control means and associated linkage for changing the angular position of the drive wheels and thus vehicle speed in response to commands from the onboard microcomputer. The microcomputer communicates with a central computer via a bidirectional communications link. The central computer controls the speed and acceleration of each vehicle by selectively communicating with the microcomputers on board the vehicles.

16 Claims, 4 Drawing Figures

INTELLIGENT DRIVERLESS VEHICLE

BACKGROUND OF THE INVENTION

The present invention relates in general to a conveyor system wherein vehicles on a track are propelled by a rotating drive shaft engaging with drive wheels on the bottom of the vehicles. A vehicle and track system of this type is disclosed in U.S. Pat. No. 3,818,837 issued June 25, 1974. The aforementioned patent discloses a vehicle having a speed control device on its rear end, in the form of cams and cam followers, which cooperates with a drive control member on the front end of an adjacent vehicle. Contact between a cam on one vehicle and the drive control member on the next vehicle causes the last mentioned vehicle to accumulate or stop by oscillating the drive wheel with respect to the drive shaft.

Another speed control device for these so-called driverless vehicles is disclosed in U.S. Pat. No. 3,903,810 issued Sept. 9, 1975. The speed control device disclosed in this patent also uses cams and cam followers to control the speed of the vehicle and to bring the vehicle to a complete stop, such as at a loading station.

The prior art vehicles and track systems discussed above have the disadvantage of requiring mechanical systems in the form of cams and cam followers to control the speed of the vehicle or to stop the vehicle. Another drawback of these systems is that the location of any vehicle on the track at any given time is not known without physically searching for the vehicle. A further drawback of these systems is that the speed and acceleration of each vehicle cannot be individually controlled.

It is therefore desirable to provide a driverless vehicle and track system which does not require the use of mechanical systems such as cams and cam followers to control the speed of the vehicles or to stop the vehicles to prevent collision therebetween. It is also desirable to provide a driverless vehicle and track system wherein the speed and acceleration of each vehicle can be individually controlled. It is further desirable to provide a driverless vehicle and track system wherein the exact location of each vehicle in the system is known at any given time.

SUMMARY OF THE INVENTION

An intelligent driverless vehicle rides on a track system and has a slave microcomputer (hereinafter "slave" or "microcomputer") associated therewith. A position encoder disposed on the vehicle communicates with the microcomputer. The microcomputer computes speed and position data for its vehicle and communicates this information to a central computer (hereinafter "host" or "central" computer). The central computer keeps track of and controls the position and speed of every vehicle on the track system.

Means are provided on the vehicle for controlling the speed of the vehicle in response to signals from the central computer. The speed control means comprises a drive wheel control mechanism such as a motor and gear box which drives a mechanical linkage connected to the drive wheel. Movement of the mechanical linkage changes the angular position of the drive wheels relative to the drive shaft, thereby increasing or decreasing the speed of the vehicle. The speed control means may have an angular position encoder associated therewith which supplies a signal representative of the current angular position of the drive wheels to the slave microcomputer.

Acceleration and deceleration of the vehicle is controlled by adjusting the angular position of the drive wheel over time and measuring the change in speed of the vehicle over the same time period.

Means comprising a sliding contact and associated bus are provided for supplying electricity to the vehicle. Means are also provided to enable the microcomputer to bidirectionally communicate with the central computer and may comprise any suitable means such as a sliding contact and an associated communications bus, a radio transceiver or a flexible duct containing control wires.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
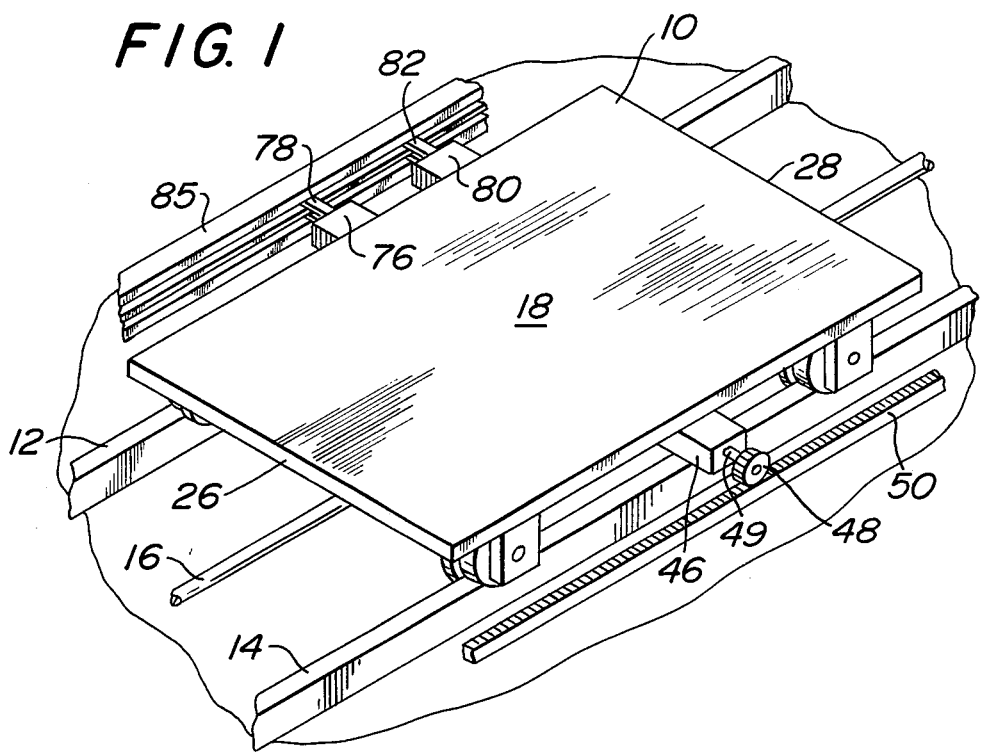
FIG. 1 is a perspective view of a driverless vehicle and track system according to the present invention.

Referring to the drawings wherein like numerals represent like elements, there is illustrated in FIG. 1 a vehicle labeled generally 10. Vehicle 10 is provided with wheels 20a, 20b, 20c, and 20d in rolling contact with tracks 12, 14. The system also includes a drive shaft means 16 which is preferably a plurality of interconnected cylinders or rods parallel to the tracks 12 and 14 and mounted for rotation about a longitudinal axis. The vehicle 10 includes a frame having a generally horizontal platform 18 on which goods or articles may be supported for movement along the track system. The frame includes a front wall 26 and a rear wall 28.

As illustrated in the drawings, each of the wheels 20a-20d are supported for rotation by means of a U shaped bracket 22 and an axle 24. The vehicle also comprises a pair of drive wheel means 30, 32. The drive wheel means 30, 32 are identical and therefore only drive wheel means 30 will be described in detail. Drive wheel means 30 comprises a wheel 34 supported for rotation about its horizontal axis by means of a U shaped bracket 38 and an axle 39. Axle 39 extends between the opposing members of the U shaped bracket 38 and through the drive wheel 34. The drive wheel means 30 is also adapted for oscillation about its vertical axis by means of plates 40 and 42. Bracket 38 is fixedly secured to plate 40. Plate 40 may oscillate with respect to a stationary plate 42 fixedly secured to the platform 18 of vehicle 10. Plate 40 is mounted for oscillation in plate 42 in conventional manner, such as through the use of ball bearings, etc. as is common in caster mechanisms.

Drive wheels 34, 36 contact the periphery of drive shaft 16 and drive the vehicle 10 thereby at a speed depending upon the angular position of drive wheels 34, 36. It will be seen that the drive wheels 34 and 36 oscillate in unison by means of a mechanical linkage as will be explained hereinafter.

Each of the drive wheel means 34, 36 is adapted to oscillate through an arc of about 45 degrees from an accumulation or stop position to a full drive position. The speed of the vehicle 10 increases progressively as the angle between the longitudinal axis of drive shaft 16 and the axes of rotation of drive wheels 34, 36 increases and the speed is at a maximum when the angle is 45 degrees. The angular position of the drive wheels 34, 36 relative to the drive shaft means 16 is adjusted by means of a drive wheel control mechanism described herein.

In a preferred embodiment of the invention, a drive control means comprises a drive wheel control mechanism such as a motor and gear box 70, a control member 60, a connecting member 44, and a pair of arms 56, 58. Unit 70 may be any well known servo motor and gear box which has an output shaft which rotates in accordance with a signal supplied to its input. A control member 60 is connected to the output shaft of servo and gear box 70 and is adapted to oscillate in a horizontal plane. The amount of movement of control member 60 is controlled by the input signal to the servo and gear box 70. The distal end of control member 60 engages with a connecting member 44 by means of a pin 66 fixedly secured to connecting member 44 at any convenient location intermediate its ends. The pin 66 projects through a slot 68 in the distal end of control member 60. The ends of connecting member 44 are pivotally connected to the ends of arms 56, 58 by means of pins 62, 64. The opposite of the arms 56, 58 are fixedly secured to the U shaped brackets 38 on drive wheel means 30, 32 by any convenient means such as bolts, welding, etc.

It can be seen that as control member 60 oscillates, connecting member 44 is also caused to oscillate between the first end 26 and the second end 28 of vehicle 10. Movement of connecting member 44 thus causes arms 56, 58 to pivot about pins 62, 64 which in turn causes oscillation of drive wheels 34, 36. It will be appreciated that the longitudinal axis of connecting member 44 remains parallel to the longitudinal axis of drive shaft 16. It will also be appreciated that the longitudinal axis of control member 60 remains parallel with the longitudinal axes of arms 56, 58.

If desired, an angular position encoder 74 may be disposed on the output shaft of servo and gear box 70. Encoder 74 provides an electrical output signal indicative of the angular position of control member 60 and thus of the angular position of drive wheels 34, 36. The angular position of drive wheels 34, 36 is a direct indication of the speed of vehicle 10. The electrical output signal from encoder 74 is provided to a microcomputer 88, as will be explained. However, the angular position encoder is not required since the speed of the vehicle, and hence the angular position of the drive wheel, is measurable by means of a position encoder 46 to be described hereinafter.

In an alternative embodiment of the invention, the drive wheel control means comprises a constant speed, clutchbrake type motor which is used in place of the servo 70 previously described. Again, the angular position encoder 74 is not required since the speed of the vehicle is directly measurable from a position encoder 46 to be described hereinafter. The angular position of the drive wheel can be adjusted by operating the clutch-brake mechanism on the motor, via commands from the microcomputer 88, until the desired speed of the vehicle has been obtained.

Conveniently mounted on the underside of platform 18 of vehicle 10, and protruding from the side thereof, is a position encoder 46. Position encoder 46 may be any well-known position encoder, such as a shaft encoder, which provides an output signal such as a pulse when its input shaft is rotated by a predetermined amount. Position encoder 46 has an input shaft 49 and a pinion gear 48 secured to the end thereof. Located adjacent to tracks 12 and 14 and running parallel therewith is a rack 50 having teeth on its upper side, as shown. The teeth on pinion gear 48 mesh with the teeth on rack 50 so that as the vehicle 10 rolls along tracks 12, 14, pinion gear 48 and shaft 49 rotate. The output from position encoder 46 is provided to a microcomputer as will be explained hereinafter. It will be appreciated that the signal from the position encoder 46 enables the microcomputer to determine the position of vehicle 10 relative to a fixed reference. It will also be appreciated that the output signal from position encoder 46 enables microcomputer 88 to compute vehicle speed since the frequency of the pulses is a direct indication of vehicle speed. As will be explained herein after, the instantaneous position of each vehicle 10 is also supplied to a central computer.

Figure 2:
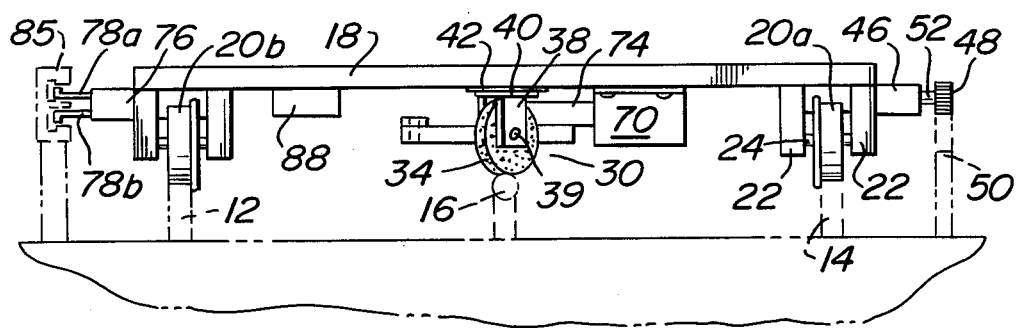
FIG. 2 is a side elevation view of the vehicle and track system according to the invention.

Also conveniently located on the underside of platform 18 of vehicle 10 is a contact holder 76 having a pair of sliding contacts 78a, 78b mounted therein. As best seen in FIG. 2, the contacts 78a, 78b slideably engage with a rail 85 which is located adjacent to the tracks 12 and 14 and runs parallel therewith. Rail 85 contains a bus (not shown) which supplies electrical energy to the vehicle 10 through sliding contacts 78a, 78b. Electricity is supplied via contacts 78a, 78b and through wires 84 to the servo and gear box 70 (or the clutch-brake motor), the onboard microcomputer 88, and to other circuitry as vehicle 10 moves along the tracks 12, 14.

Figure 4:
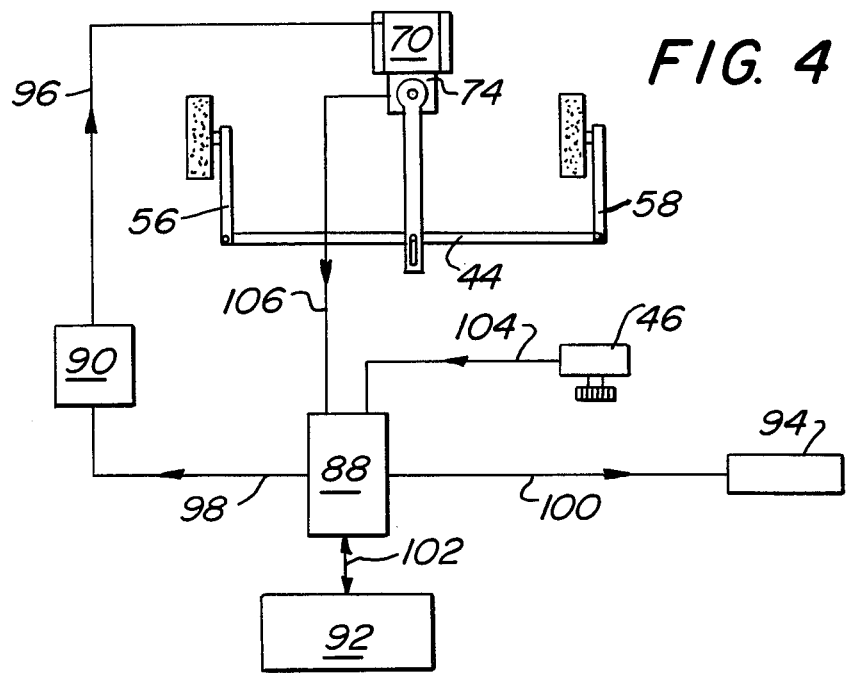
FIG. 4 is a schematic diagram illustrating the cooperation among the various elements of the inventive vehicle and track system.

Referring now to FIG. 4, the operation of the vehicle 10 will be explained.

Servo and gear box 70 (or the clutch-brake motor) is responsive to signals provided by an onboard microcomputer 88 operating under an appropriate control algorithm. As shown, microcomputer 88 communicates via line 98 with driver circuitry 90 which in turn communicates with DC servo (or clutch-brake motor) 70 via line 96. Driver circuitry 90 provides the requisite voltage and current needed to drive servo (or clutch-brake motor) 70 in response to signals from microcomputer 88.

If utilized, angular position encoder 74 provides an output signal representative of the angular position of drive wheels 34, 36 to microcomputer 88 via line 106. Position encoder 46 provides position and speed information, such as periodic pulses, to microcomputer 88 via line 104. Microcomputer 88 also communicates with an optional brake 94 via line 100. Brake 94 is used for quick stopping and may comprise a pair of braking discs, an electro magnetic brake, or any other well known braking means.

Figure 3:
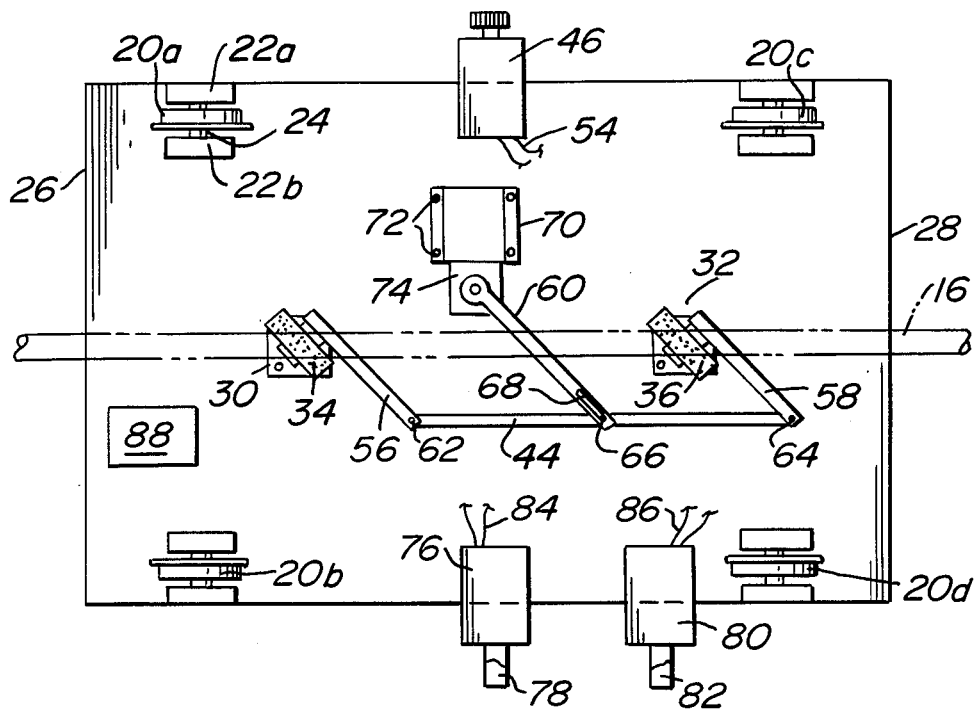
FIG. 3 is a bottom plan view of a vehicle according to the invention.

A bi-directional communications link 102 is established between each microcomputer 88 located on each vehicle 10 and a central computer 92. The bi-directional link 102 may be a well known serial data communications link utilizing the commonly available serial data communication port available on microcomputer 88 and central computer 92. The bi-directional communications link 102 may be established by any convenient means, such as by radio communications between each micrcomputer 88 and the central computer 92, or by means of one or more flexible ducts containing wires which travel with each vehicle 10. Communications link 102 may also comprise a pair of sliding contacts which engage with a serial data communications bus in rail 85. This embodiment is illustrated in FIGS. 1 and 3. As shown therein, a contact holder 80 holds a pair of contacts 82 which slideably engage in rail 85, in a manner similar to that shown for contacts 78a, 78b in FIG. 2. One end of the contacts 82 communicates with a serial data bus (not shown) disposed inside rail 85 which in turn communicates with central computer 92. Communication between the other end of contacts 82 and microcomputer 88 is achieved via wires 86.

It is known in such vehicles that, as the angular position of the drive wheels change, there is a corresponding change in speed of the vehicle. The vehicle 10 will be at a complete stop or accumulation position when the axes of drive wheels 34, 36 are parallel to the longitudinal axis of drive shaft 16, and will move at maximum speed when the axes of rotation of the drive wheels 34, 36 are at an angle of 45 degrees to the longitudinal axis of drive shaft 16. If used, the angular position encoder 74 continuously supplies information regarding the angular position of the drive wheels 34, 36 to microcomputer 88. The microcomputer 88 may have a lookup table stored in its memory which correlates the desired speed of the vehicle 10 to a particular angular position of drive wheels 34, 36. The lookup table is based on a predetermined speed of rotation of drive shaft 16.

Microcomputer 88 continuously updates the position and speed of its associated vehicle 10 on the track in response to signals provided by position encoder 46. Position encoder 46 provides a signal such as a pulse when the vehicle has moved a predetermined distance, and microcomputer 88 thereby keeps track of the position of the vehicle. The speed of the vehicle 10 is also determinable by measuring the frequency of the pulse train provided by the position encoder 46. The current position and speed of each vehicle 10 is made available to central computer 92 via communications link 102.

Each microcomputer 88 on each vehicle 10 is individually addressable by central computer 92 via link 102. Central computer 92 continously reads the speed and position data provided by each microcomputer 88 and thus monitors the speed and position of each vehicle 10. Based upon the speed and position data provided by each microcomputer 88 and the relative speed and position of all other vehicles 10 on the track system, or based upon preprogrammed stops for vehicles 10, such as at loading stations, central computer 92 determines whether the speed of one or more vehicles 10 should be increased or decreased, or whether a vehicle should be brought to a complete stop. For example, if central computer 92 determines that two adjacent vehicles are too close to each other, it will be necessary to adjust the speed of one of the vehicles. Alternatively, if one vehicle has come to a complete stop, such as at a loading station, it will be necessary to bring adjacent oncoming vehicles to a complete stop or to a slow creep to avoid collision.

Central computer 92 computes the desired speed for each vehicle 10 and supplies this speed data to the appropriate one of the microcomputers 88 associated with the appropriate vehicle 10. Microcomputer 88 calculates the difference between the current speed of the vehicle and desired speed. Based upon the calculated difference, microcomputer 88 determines the new angular position for drive wheels 34, 36 to bring vehicle 10 to the desired speed via means of a lookup table which correlates speed and angular position. Microcomputer 88 then supplies an appropriate signal over line 98 to driver circuitry 90 which in turn supplies the requisite voltage and current needed to drive servo (or clutch-brake motor) 70. Servo and gear box (or clutch-brake motor) 70 respond by rotating its output shaft, thereby causing control arm 60 to oscillate and causing the angular position of drive wheels 34, 36 to change. If used, the angular position encoder 74 continuously supplies a signal representative of the instantaneous angular position of drive wheels 34, 36 to microcomputer 88. However, as mentioned, the angular position of the drive wheel can be determined by measuring the speed of vehicle from position encoder 46. The aforementioned look-up table is used to correlate the angular position of the drive wheels to the speed of the vehicle. Microcomputer 88 supplies signals to driver circuitry 90 until the desired vehicle speed is obtained. If the angular position encoder 74 is used, microcomputer may moniter its output to determine when the angular position of the drive wheels 34, 36 equals the desired angular position previously computed by microcomputer 88.

Central computer 92 may also supply position commands to microcomputers 88 on selected vehicles 10. For exmaple, central computer 92 may direct a vehicle 10 to move to a particular position somewhere along the track 12, 14. The microcomputer 88 on the selected vehicle 10 will monitor the position of the vehicle via the signals supplied by position encoder 46 and cause the vehicle to move along the track until the current position of the vehicle coincides with the desired position of the vehicle.

If central computer 92 determines that vehicle 10 should be brought to an immediate stop, then an appropriate signal may be supplied over communications link 102 to microcomputer 88 to command brake 94 to engage and bring the vehicle to an immediate stop.

It is known that the acceleration and deceleration of vehicles 10 may be controlled by adjusting the rate at which drive wheels 34, 36 are caused to oscillate to a new angular position. That is, the rate at which the angular position of drive wheels 34, 36 is changed will determine the acceleration or deceleration of vehicle 10. Central computer 92 may supply appropriate acceleration rates and or deceleration rates to appropriate microcomputers 88 via communications link 102. Microcomputers 88 may be programmed to respond by converting the acceleration/deceleration rates supplied by central computer 92 to a rate of change of the angular position of the drive wheels. Thus, by varying the magnitude or frequency of the signal applied to driver circuitry 90, a quicker or slower oscillation of the drive wheels and thus a quicker or slower rate of acceleration or deceleration will result. It will be appreciated that the rate of acceleration or deceleration may be monitored by microcomputer 88 via the signal from angular position encoder 74, if used. Thus, the rate of change of the signal supplied over line 104 is a direct indication of the actual rate of acceleration or deceleration of the vehicle 10. The signal from position encoder 46 also provides an indication of the acceleration or deceleration rate. Thus, the rate of change of the frequency of the pulse train from position encoder 46 is a measure of the vehicle's rate of acceleration or deceleration.

It will be seen that the present invention eliminates mechanical systems previously used for speed control.

The present invention does not require the use of cams or cam followers or any of the associated mechanical linkages. It will also be appreciated that the central computer 92 may determine when a vehicle has reached an appropriate work station and when a vehicle should be brought to a stop for unloading, avoiding collision, etc. Central computer 92 monitors the position and speed of each vehicle on the track system and selectively issues speed and acceleration commands to each vehicle, thus providing precise control over the entire vehicle and track system. It will also be appreciated that by monitoring the position of each vehicle, precise positioning of a vehicle, such as at a loading station, can be provided.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus comprising:
   (a) a vehicle mounted on support wheels adapted to ride on a track;
   (b) drive wheel means mounted on said vehicle, said drive wheel means including a drive wheel oscillatible between a drive position and an accumulation position;
   (c) a slave computer associated with said vehicle;
   (d) drive wheel control means disposed on said vehicle, said drive wheel control means having an output shaft movable in response to signals generated by said slave computer;
   (e) a control linkage operatively connected to said drive wheel means and to said output shaft, said control linkage being responsive to movement of said output shaft to oscillate said drive wheel between said drive position and said accumulation position; whereby the movement of said vehicle is regulated by adjusting said drive wheel position in accordance with signals provided by said slave computer.

2. Apparatus according to claim 1 further comprising an angular position encoder associated with said drive wheel control means, said angular position encoder providing an output signal representative of the angular position of said drive wheel means to said slave computer.

3. Apparatus according to claim 1 further comprising a position encoder disposed on said vehicle, said position encoder generating an output signal when said vehicle has travelled a predetermined distance, said signal being supplied to said slave computer.

4. Apparatus according to claim 3 wherein said position encoder comprises an input shaft and a pinion gear affixed thereto, said pinion gear engaging with teeth in a rack located adjacent to said track, said input shaft thereby rotating as said vehicle moves on said track, said position encoder providing an output signal such as a pulse for a predetermined amount of rotation of said input shaft.

5. Apparatus according to claim 1 further comprising a track system and a host computer remote from said vehicle, said slave computer communicating with said host computer, said slave computer providing vehicle operating parameters to said host computer, said host computer providing vehicle control data to said slave computer.

6. Apparatus according to claim 4 wherein said slave computer communicates with said host computer via a bidirectional communications link comprising a pair of slideable contacts disposed on said vehicle, one end of said slideable contacts slideably and electrically communicating with a communications bus operatively connected to said host computer, the other end of said slideable contacts operatively connected to said slave computer.

7. Apparatus according to claim 1 further comprising a brake operatively affixed to said vehicle and communicating with said slave computer, said brake being responsive to stop said vehicle in response to signals from said slave computer.

8. Apparatus according to claim 1 wherein said drive wheel control means comprises a servo motor.

9. Apparatus according to claim 1 wherein said drive wheel control means comprises a constant speed clutch-brake motor.

10. A speed and position control system for vehicles adapted to ride on a track wherein each vehicle comprises:
    (a) a drive wheel in rolling contact with a rotating drive shaft, said drive wheel being oscillatable between a drive position and an accumulation position;
    (b) a slave computer;
    (c) drive wheel control means having an output shaft movable in response to signals from said slave computer;
    (d) a control linkage operatively connected to said drive wheel and to said output shaft of said drive wheel control means for oscillating said drive wheel means in response to the movement of said output shaft;
    (e) means for generating a signal representative of a change of the position of said vehicle on said track, said track position signal being supplied to said slave computer; said control system further comprising
    (f) a host computer communicating with each slave computer via a bidirectional communications link; whereby operating parameters such as speed and position are determined for each vehicle by its slave computer based upon said track position signal, said operating parameters being supplied to said host computer via said communications link, said host computer determining new vehicle operating parameters and communicating said new vehicle operating parameters to selected ones of said slave computers, each selected slave computer thereby supplying a signal to its associated drive wheel control means to adjust said vehicle operating parameters accordingly.

11. A speed and position control system according to claim 10 further comprising means connected to said output shaft of said drive wheel control for generating a signal representative of said drive wheel position.

12. A speed and position control system according to claim 10 wherein said means for generating a signal representative of a change of the position of said vehicle on said track comprises a position encoder disposed on said vehicle, said position encoder having an input shaft and a pinion gear affixed thereto, said pinion gear engaging with teeth in a rack located adjacent said track, said input shaft thereby rotating as said vehicle moves on said track and providing a signal such as a pulse when said vehicle has moved a predetermined distance.

13. A speed and position control system according to claim 10 wherein said bidirectional communications link comprises a pair of slideable contacts disposed on said vehicle, one end of said pair of slideable contacts slideably and electrically communicating with a communications bus adjacent said track and parallel therewith, said communications bus being operatively connected to said host computer, the other end of said pair of slideable contacts operatively connected to said slave computer.

14. A speed and position control system according to claim 13 wherein said communications bus comprises a pair of conductors and said communications link comprises a serial data communications link.

15. A speed and position control system according to claim 10 wherein each vehicle further comprises a brake operatively affixed to said vehicle and communicating with said slave computer, said brake being responsive to stop said vehicle according to signals provided by said slave computer.

16. A vehicle and track system comprising:
 (a) a plurality of vehicles, each vehicle being mounted on wheels adapted to ride on a track;
 (b) drive shaft means including a drive shaft disposed adjacent and parallel to said track, said drive shaft being rotatable about its longitudinal axis;
 (c) drive wheel means mounted on each of said vehicles, said drive wheel means including a drive wheel in rolling contact with the periphery of said drive shaft, said drive wheel being oscillatable between a drive position and accumulation position;
 (d) a plurality of slave computers, each vehicle having a slave computer associated therewith;
 (e) a host computer communicating with each slave computer via a bidirectional communications link;
 (f) drive wheel control means disposed on each vehicle, each drive wheel control means having an output shaft movable in response to signals from its slave computer;
 (g) a control linkage disposed on each vehicle, each control linkage being operatively connected to said drive wheel means and to said output shaft for oscillating said drive wheel between said drive position and said accumulation position in response to the movement of said output shaft;
 (h) a first position encoder disposed on each servo means for providing an output signal representative of said drive wheel position to said slave computer;
 (i) a second position encoder disposed on each vehicle for generating an output signal representative of a change of position of said vehicle on said track, each second position encoder comprising an input shaft and a pinion gear affixed thereto, said pinion gear engaging with teeth in a rack located adjacent said track, said input shaft thereby rotating as said vehicle moves on said track, said second position encoder generating an output signal such as a pulse when said vehicle has travelled a predetermined distance; whereby vehicle operating parameters such as the speed and position of each vehicle are provided to said host computer by each of said slave computers, said host computer keeping track of the operating parameters of each vehicle and computing new vehicle operating parameters for selected vehicles and providing said operating parameters to the appropriate ones of said slave computers, each of said slave computers supplying a signal to its drive wheel control means to adjust the operating parameters of its respective vehicle.

* * * * *